US012534355B2

(12) United States Patent
Silhavy

(10) Patent No.: US 12,534,355 B2
(45) Date of Patent: Jan. 27, 2026

(54) METHOD FOR REFILLING AN EMPTY FRAGRANCE CONTAINER IN-STORE

(71) Applicant: Coty Inc., New York, NY (US)

(72) Inventor: Christophe J Silhavy, Levallois-Perret (FR)

(73) Assignee: Coty Inc., New York, NY (US)

( * ) Notice: Subject to any disclaimer, the term of this patent is extended or adjusted under 35 U.S.C. 154(b) by 45 days.

(21) Appl. No.: 18/559,530

(22) PCT Filed: May 26, 2022

(86) PCT No.: PCT/US2022/031153
§ 371 (c)(1),
(2) Date: Nov. 7, 2023

(87) PCT Pub. No.: WO2022/251512
PCT Pub. Date: Dec. 1, 2022

(65) Prior Publication Data

US 2024/0228255 A1 Jul. 11, 2024

Related U.S. Application Data

(60) Provisional application No. 63/193,858, filed on May 27, 2021.

(51) Int. Cl.
*B67C 3/00* (2006.01)
*B67C 3/20* (2006.01)
*G07F 13/06* (2006.01)

(52) U.S. Cl.
CPC .............. *B67C 3/208* (2013.01); *B67C 3/001* (2013.01); *B67C 3/007* (2013.01); *G07F 13/06* (2013.01)

(58) Field of Classification Search
CPC ......... B67C 3/208; B67C 3/001; B67C 3/007; G07F 13/06
See application file for complete search history.

(56) References Cited

U.S. PATENT DOCUMENTS

2016/0200463 A1 7/2016 Hodges et al.
2017/0096321 A1* 4/2017 Levenstein ............. B67C 3/208
2017/0228959 A1* 8/2017 Bothos ..................... B67D 7/80

FOREIGN PATENT DOCUMENTS

CN 117178306 A 12/2023
WO WO-2018108584 A1 * 6/2018
(Continued)

OTHER PUBLICATIONS

"International Application Serial No. PCT/US2022/031153, International Search Report mailed Sep. 5, 2022", 4 pgs.
(Continued)

*Primary Examiner* — Jason K Niesz
(74) *Attorney, Agent, or Firm* — Schwegman Lundberg & Woessner, P.A.

(57) ABSTRACT

A method of refilling an empty container with a fragrance, using a refilling platform comprising a transfer system and defining channels having an inlet and an outlet, the method comprising: Adding a preselected amount of fragrance concentrate to the inlet of the refilling platform wherein the preselected amount of fragrance concentrate is transferred with the transfer system through the outlet of the refilling platform into the empty container to partially fill the container; Adding an amount of distilled water to the inlet of the refilling platform wherein the distilled water is transferred through the outlet of the refilling platform with the transfer system to the partially filled container containing the fragrance concentrate; Adding an amount of ethanol to the inlet of the refilling platform wherein the refilling platform concurrently cleaned with transferring the ethanol through the outlet of the refilling platform to the at least partially filled container containing the preselected volume of fragrance concentrate and distilled water so that the container is at (Continued)

least partially filled with fragrance concentrate, distilled water and ethanol.

9 Claims, 5 Drawing Sheets

(56) References Cited

FOREIGN PATENT DOCUMENTS

| | | | |
|---|---|---|---|
| WO | WO-2019161360 | A1 | 8/2019 |
| WO | WO-2022251512 | A1 | 12/2022 |

OTHER PUBLICATIONS

"International Application Serial No. PCT/US2022/031153, Written Opinion mailed Sep. 5, 2022", 5 pgs.
"Chinese Application Serial No. 202280029649.9, Voluntary Amendment filed Dec. 28, 2023", w/ English Claims, 14 pgs.
"International Application Serial No. PCT/US2022/031153, International Preliminary Report on Patentability mailed Dec. 7, 2023", 7 pgs.
"Chinese Application Serial No. 202280029649.9, Office Action mailed Jul. 12, 2025", 7 pgs.

* cited by examiner

METHOD FOR REFILLING AN EMPTY FRAGRANCE CONTAINER IN-STORE

CROSS-REFERENCE TO RELATED APPLICATION

This application is a U.S. National Stage Filing under 35 U.S.C. 371 from International Application No. PCT/US2022/031153, filed on 26 May 2022, and published as WO 2022/251512 on 1 Dec. 2022, which application claims the benefit of priority to U.S. Provisional Application Ser. No. 63/193,858, filed May 27, 2021, all which applications are incorporated herein by reference in their entireties.

FIELD

Inventive embodiments disclosed herein relate to a method for refilling a fragrance container in-store.

BACKGROUND

Economic factors and consumers of cosmetics are requiring manufacturers to implement sustainability measures in the making of cosmetic products. Sustainability includes a meeting of present needs without compromising an ability of future generations to meet their own needs.

SUMMARY

Inventive embodiments include a method for refilling a container with a fragrance, using a refilling platform comprising a transfer system and defining channels or conduits such as tubing having an inlet and an outlet. The method includes adding a preselected amount of fragrance concentrate to the inlet of the refilling platform wherein the preselected amount of fragrance concentrate is transferred with the transfer system through the outlet of the refilling platform into the container to partially fill the container. The method also includes adding an amount of distilled water to the inlet of the refilling platform wherein the distilled water is transferred through the outlet of the refilling platform with the transfer system to the partially filled container containing the fragrance concentrate. The method also includes adding an amount of ethanol to the inlet of the refilling platform wherein the refilling platform concurrently cleaned with transferring the ethanol through the outlet of the refilling platform to the at least partially filled container containing the preselected volume of fragrance concentrate and distilled water so that the container is at least partially filled with fragrance concentrate, distilled water and ethanol.

DESCRIPTION OF DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
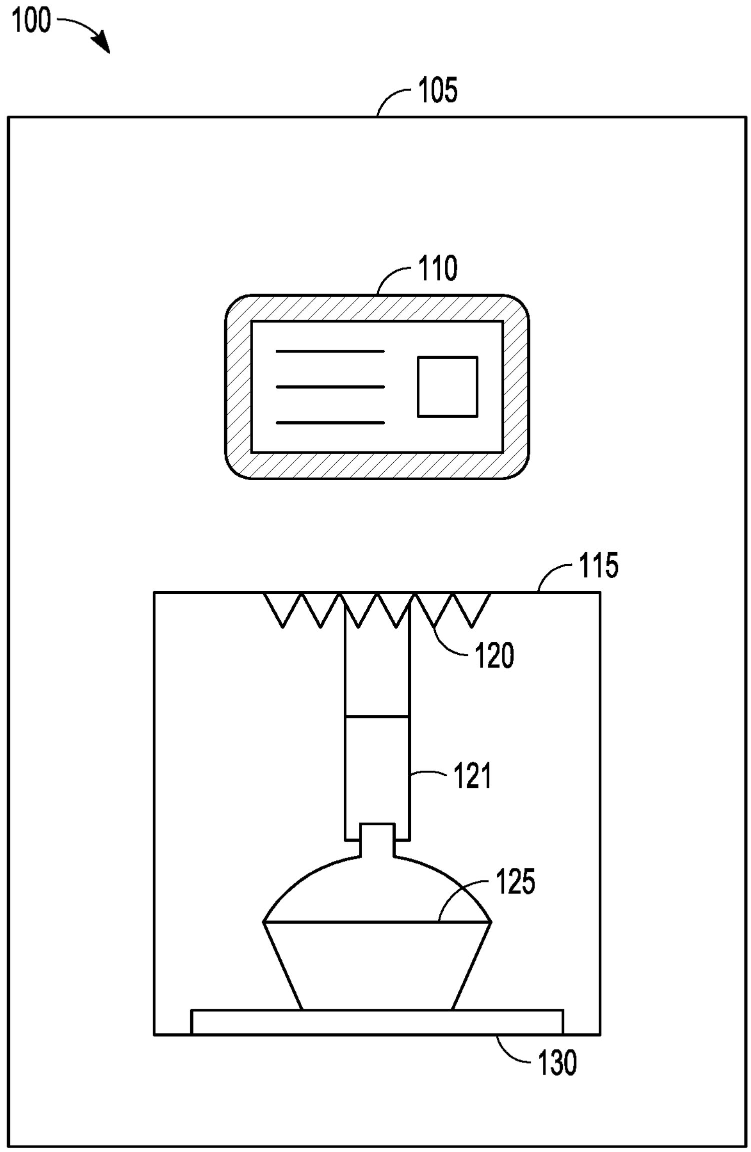
FIG. 1 illustrates the front side of a fragrance refilling platform in accordance with some embodiments.

Inventive embodiments include a method for refilling a container with a fragrance, using a refilling platform that includes a transfer system. In some embodiments, the refilling platform defines channels. In other embodiments, the refilling platform includes conduits such as tubing having an inlet and an outlet. The method includes adding a preselected amount of fragrance concentrate to the inlet of the refilling platform wherein the preselected amount of fragrance concentrate is transferred with the transfer system through the outlet of the refilling platform into the container to partially fill the container. The method also includes adding an amount of distilled water to the inlet of the refilling platform wherein the distilled water is transferred through the outlet of the refilling platform with the transfer system to the partially filled container containing the fragrance concentrate. The method also includes adding an amount of ethanol to the inlet of the refilling platform wherein the refilling platform is concurrently cleaned with transferring the ethanol through the outlet of the refilling platform to the at least partially filled container containing the preselected volume of fragrance concentrate and distilled water so that the container is at least partially filled with fragrance concentrate, distilled water and ethanol.

While the specification concludes with claims, which particularly point out and distinctly claim the invention, it is believed the present invention will be better understood from the following description.

Unless defined otherwise, all technical and scientific terms used herein have the same meaning as commonly understood by a person of ordinary skill in the art. As used in the specification and the appended claims, the singular forms "a." "an" and "the" include plural referents unless the context clearly dictates otherwise. The term "may" in the context of this application means "is permitted to" or "is able to" and is a synonym for the term "can." The term "may" as used herein does not mean possibility of chance. The term and/or in the context of this application means one or the other or both. For example, an aqueous solution of A and/or B means an aqueous solution of A alone, an aqueous solution of B alone and an aqueous solution of a combination of A and B.

The term, "refilling platform" as used herein refers to a structure that receives liquid from each of a fragrance concentrate reservoir, distilled water reservoir and ethanol reservoir and transfers the liquid to a refillable container.

The term, "transfer system" as used herein refers to tubing, channels or other conduits for transferring liquid from an inlet to a refillable container.

The term, "preselected amount of fragrance" as used herein refers to a fragrance that a user selects with a graphical user interface, GUI, and a corresponding weight or volume of the fragrance dispensed to the refillable bottle. When the user selects a fragrance, a weight or volume of fragrance concentrate, distilled water and ethanol is calculated.

The terms "bottle" and "container" are used interchangeably herein. For some embodiments, the container is empty prior to refilling. For other embodiments, the container contains fragrance liquid or vapor prior to refilling.

With the method embodiments disclosed herein, consumers may refill, in-store, their empty fragrance bottles. Fragrance bottles may be either transparent bottles or opaque bottles, or a combination of transparent and opaque bottles, using a simple user interface without complex manipulations.

Inventive embodiments disclosed herein enable in-store filling or refilling of fragrance containers. Users select a fragrance from several fragrances. In one embodiment, refillable containers are attached to pumps such as crimped pumps or screw pumps by users for refilling. In some embodiments, refillable containers include a code, such as a bar code that enables the refillable container to attach to the refilling platform and transfer system.

Refillable containers are at least partially filled with a selected fragrance concentrate. Each fragrance may be dispensed at a concentration, up to 20% w/w with the same refilling platform. Refilling the refillable containers with the fragrance concentrate is followed by partially refilling the refillable container with distilled water and then partially refilling with ethanol, in that order. Refilling with ethanol last serves a dual function of adding an ingredient to the refillable container and cleaning the components to which the ingredients of fragrance concentrate, distilled water and ethanol were exposed. For some embodiments, the ingredients of fragrance concentrate, distilled water and ethanol are mixed in the refillable container.

It has surprisingly been found that refilling a fragrance container with a fragrance concentrate, distilled water and ethanol, in that order, provides a fragrance to a user having the same organoleptic properties as the original fragrance.

In the embodiments described herein, the refilling platform is adapted to cooperate with a plurality of fragrance concentrates different from each other and a plurality of refillable bottles. Each fragrance concentrate is stored in a separate reservoir. In some embodiments, the refillable containers are filled one at a time. Refillable containers disclosed herein have not been developed specifically to form part of the filling platform. Prior to refilling, the fragrance container is emptied of liquid.

FIG. 1 illustrates the front side of a fragrance refilling platform 100 in accordance with some embodiments. The fragrance refilling platform 100 includes a housing 105 for containing the fragrance concentrate formulation reservoir (s), distilled water reservoir and ethanol reservoir, the dispensing system for each of the fragrance formulation reservoir(s), distilled water reservoir and ethanol reservoir, formulation reservoir and the control computer. The front of the housing 105 for the fragrance refilling platform 100 may include the display screen 110 for the GUI and an opening 115 for the placement of a container 125 to be refilled. In one embodiment, the container to be refilled 125 is placed on a stand that includes a load cell 130 that measures the weight of the container 125 and any residual and dispensed formulations. In other embodiments, a piston or syringe is calibrated to dispense preselected amounts of materials. Located above the container placement area may be storage and transfer conduits 120 for each of the fragrance concentrate formulation(s), distilled water and ethanol. In one embodiment, a crimped pump 121 attaches to the refillable container 125. For some embodiments, the stand also includes a mixer for mixing all the ingredients added to the container. Suitable mixers include vortex mixers, magnetic stir mixers, and vibration mixers or other type of mixer. For some embodiments, the mixer is detached from the fragrance refilling platform. For other embodiments, the mixer is a component of the fragrance refilling platform 10. For some embodiments, the mixer is a component of the stand.

The exterior of the housing may have a display screen 110 for displaying the GUI. The display screen 110 may be a touch screen allowing a user to manipulate controls on the screen with a touch from their finger. The fragrance refilling platform may also have a keyboard and mouse attached for a user to interface with the GUI. The housing may also have a set of proprietary controls for a user to interface with the GUI. The GUI may also be accessed by and/or displayed on communications devices (e.g., smartphones, personal computers, tablet computers, personal digital assistants), server computers, and/or communications networks.

The GUI is connected to a control computer held within the housing. The control computer generates the images for display on the GUI display. The control computer receives input from the GUI for the desired fragrance input by a user. The control computer may also generate messages to be displayed on the GUI display, such as when a fragrance concentrate formulation is low or if a problem has been detected with the dispensing system. The control computer, based on the input received for a desired fragrance and corresponding concentrations of distilled water and ethanol calculates the amount of each fragrance formulation, distilled water and ethanol to create a final desired fragrance.

Figure 2:
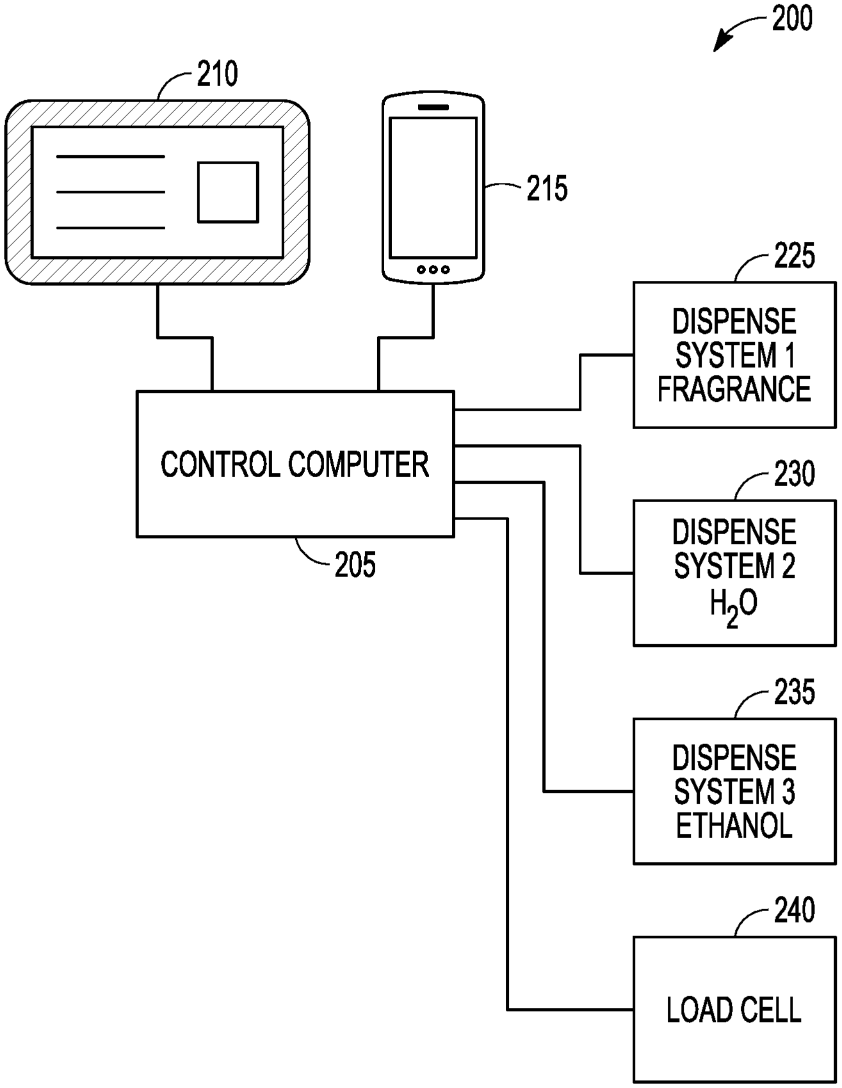
FIG. 2 illustrates an example of the components for a refilling platform in accordance with some embodiments.

FIG. 2 illustrates an example of the components for a fragrance refilling platform 200 in accordance with some embodiments. The components of a fragrance refilling platform 200 include a control computer 205. The control computer 205 generates the GUI for a user to interface with the fragrance refilling platform. A user may interact with the GUI on the display screen 510 attached to the housing of the fragrance refilling platform. A user may also interact with the GUI on a mobile device such as a smartphone 215 or tablet or other communications device (e.g., personal computers, personal digital assistants), server computers, and/or communications networks, which may connect to the control computer 205 over a wireless network, such as Wi-Fi or BLUETOOTH®. The control computer 205 may receive input from the GUI, such as the display screen 210 or smartphone 215 or other communication device, and based on the input the control computer may determine the amount of ingredients necessary to create a final fragrance formulation. The control computer 205 may initiate a dispense sequence for the final fragrance formulation. The control computer 205 controls each of the liquid dispensing systems, such as dispense system 1 225 for dispensing fragrance concentrate, dispenser system 2 230, for dispensing distilled water and dispenser system 3 235 for dispensing ethanol.

While one reservoir is shown, a fragrance dispensing system may have any number of reservoirs for each fragrance that is dispensed. Liquid dispensing systems are dependent upon the number of fragrance concentrates the fragrance refilling platform is configured to support. The control computer 205 communicates with the load cell 240 to receive weight information from the load cell 240. Based on the information received from the load cell 240, the control computer 205 controls the flow of liquid from a liquid dispensing system, such as dispenser system 1 for dispensing fragrance concentrate 225.

Each dispenser system may be configured to be suited to dispense a particular liquid to allow the dispensing of the final formulation. The dispenser systems may include mechanical, electrical, electromagnetic, optical or magnetic elements.

Figure 3:
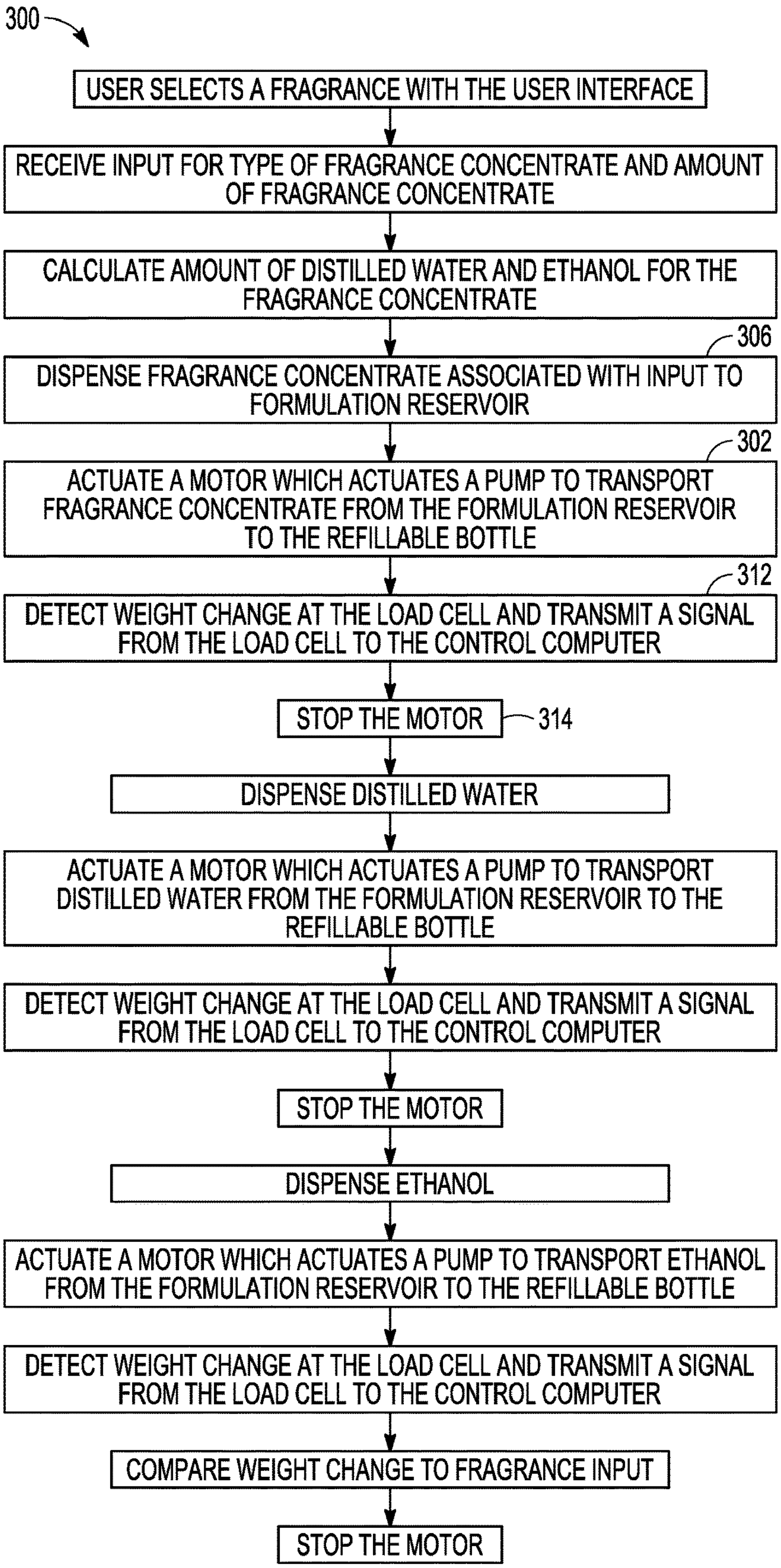
FIG. 3 illustrates a flow chart showing a refilling of the refillable container.

FIG. 3 illustrates a flow chart showing a technique 300 for dispensing a fragrance to a refillable container with a liquid dispensing system. The technique 300 includes a selection of a fragrance, by a user, with a user interface. The technique includes steps of receiving input for an amount of fragrance concentrate and calculating amounts of distilled water and ethanol for the fragrance concentrate. The technique 300 includes an operation 302 to actuate a motor to operate a pump, wherein the motor is controlled by a computer, such as in some embodiments, a vending machine controller, and the fragrance concentrate is drawn into the pump from a reservoir through a first valve. For some embodiments, the reservoir is a glass container that is vacuum sealed with the liquid contained within. The technique 300 includes an operation 304 to stop the motor or piston, or peristatic pump, when the pump reaches a predefined position. The technique 300 includes an operation 306 to receive, at the control computer, a signal to dispense a measured amount of fragrance concentrate. A system, such as the refillable container dispensing system may employ multiple liquid dispensing reservoirs for each of the fragrance formulations, which may function to add ingredients in a particular order Upon receiving a request for a fragrance, the fragrance dispensing system may calculate a measured amount of each of fragrance concentrate, distilled water, and ethanol to dispense and send a signal to the control computer so that the fragrance may be dispensed into the refillable container. Once refilling the refillable container commences, the control computer signals the mixer to mix the dispensed liquid within the refillable container.

The technique 300 includes an operation 308 to actuate the pump. The technique 300 includes an operation 310 to detect a change in weight at a load cell, wherein the load cell is positioned below the pump and configured to support a refillable container. The load cell has a weight sensor. Thus, as the fragrance concentrate is dispensed and is received into the refillable container on the load cell, the load cell records a change in weight. The load cell may be configured with a volume sensor to determine the volume of liquid dispensed. The technique 300 includes an operation 312 to transmit a signal, from the load cell to the control computer, wherein the signal contains data associated to the weight. As the load cell detects a change in weight, the change in weight data is sent to the control computer.

The technique 300 includes an operation 314 to stop the motor when the control computer determines the weight data received from the load cell indicates the measured amount of fragrance concentrate has been dispensed. The control computer may stop the dispensing of the fragrance concentrate by halting the motor from moving. The technique includes a step of dispensing distilled water after fragrance concentrate that includes activating a pump to transfer distilled water from a reservoir to the refillable container. The transfer continues until the load cell detects a change in weight in the refillable container that comports with a weight set point in the control computer. When the set point or limit is reached, the control computer halts movement of the pump.

The technique includes a step of dispensing ethanol after fragrance concentrate that includes activating a pump to transfer distilled water from a reservoir to the refillable container. The transfer continues until the load cell detects a change in weight in the refillable container that comports with a weight set point in the control computer. When the set point or limit is reached, the control computer halts movement of the pump. The user then separates the refillable container from the refillable platform.

Figure 4A:
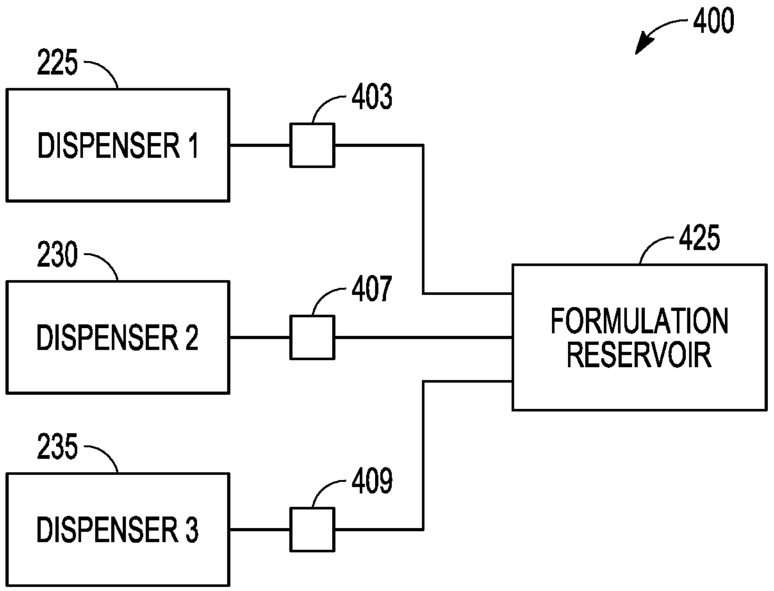
FIG. 4*a* illustrates a schematic diagram showing components for transferring formulation concentrate, distilled water, and ethanol from their storage reservoirs to a formulation reservoir.
Figure 4B:
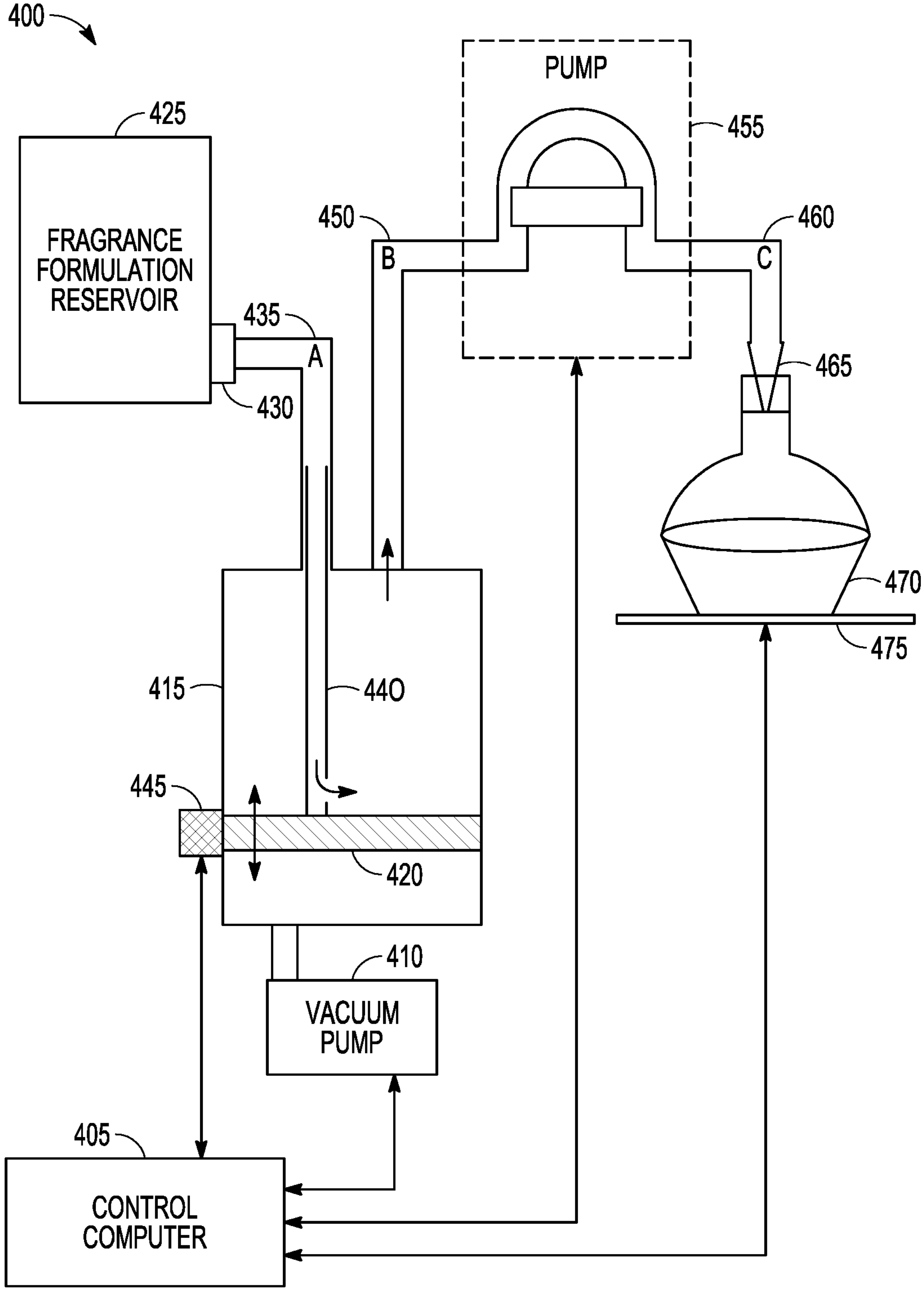
FIG. 4*b* illustrates a schematic diagram showing components for transferring formulation concentrate, distilled water, and ethanol from the formulation reservoir to the refillable container.

FIGS. 4*a* and 4*b* illustrate a liquid dispensing system 400 in accordance with some embodiments for one of the components transported in the refillable platform, concentrated fragrance. The liquid dispensing system 400 utilizes a pump 410 to draw liquid into a holding chamber 415 with a piston 420. When formulation reservoir 425 is connected, the control computer 405 activates the pump 410 connected to the holding chamber 415 to begin the initialization procedure. The pump 410 may cause the piston 420 to move downward. The suction created by the piston 420 moving downward will pull liquid from the fragrance formulation reservoir 425 through the pipework interface adapter 430 and into the pipework A 435 of the liquid dispensing system 400. The liquid is pulled through pipework A 435 and into inner pipe 440. The inner pipe 440 is connected to the piston 420 and moves up and down with the piston 420 inside the pipework A 435. The inner pipe 440 has an opening at the bottom, near the piston 420, such that the liquid flows into the holding chamber 415 near the position of the piston 420. The piston 420 moves downward as the pump 410 pulls it downward and drawing more liquid into the holding chamber 415 from the formulation cartridge 425. A magnetic sensor 445 is placed at the maximum extension of the piston 420 such that when the piston 420 reaches maximum extension the magnetic sensor 445 sends a signal to the control computer 405 to stop extracting liquid. Other sensing approaches are also envisioned. The magnetic sensor 445 holds the piston 420 in place. The holding chamber 415 may now hold enough liquid for a maximum dispense. For other embodiments, a piston is employed that does not include sensors.

When a fragrance formulation dispense is initiated, the control computer 405 sends a command to the pump 455. The pump 455 pulls liquid through pipework B 450 and pushes it out pipework C 460. The liquid is dispensed through the nozzle 465 into the refillable container 470. The refillable container 470 is placed on a balance 475 with a weight sensor. The weight sensor of the balance 475 communicates with the control computer 405. When the control computer 405 determines the signal from the balance 475 indicates an amount of liquid equivalent to the target dispense amount has been dispensed, the control computer 405 commands the pump 455 to discontinue dispensing.

While the dispensing is taking place, the piston 420 is held in place with a magnet and as the piston moves, the movement is sensed by sensor 445. The vacuum created by the pump 455 pulling liquid from the holding chamber 415 causes more liquid to flow into the holding chamber 415 from the formulation cartridge 425. By keeping the piston 420 held at a static position, it ensures the amount of liquid held in the holding chamber 415 is sufficient for a maximum dispense. When the formulation reservoir 425 is emptied of all its content, the vacuum created by the pump 455 pulling liquid from the holding chamber 415, but with no further liquid to fill the holding chamber 415 from the formulation 425 may cause the piston 420 to rise and break its connection with the magnetic sensor 445 as the pump dispenses product Upon the piston 420 connection to the magnetic sensor 445 breaking, the magnetic sensor 445 sends a signal to the control computer 405 that this has occurred. The control computer 405 may send an alert, such as to the GUI, indicating that the reservoir 425 is empty and requires a change. The benefit of the liquid dispensing system 400 utilizing the holding chamber 415 in such a way ensures that even when the formulation cartridge 425 is emptied, the liquid dispensing system 400 still has enough liquid held in the holding chamber for a maximum dispense before the formulation cartridge 425 is changed. Additionally, this prevents waste of liquid from the fragrance formulation reservoir 425 as the fragrance formulation reservoir 425 is fully emptied before an indication is made that it is ready to be changed. At the end of the dispense, the vacuum can be reapplied, in some embodiments, to align the holding chamber or piston with the magnetic sensor.

In the embodiment of FIG. 4, any type of position sensor may be used in place of the magnetic sensor 445. In the embodiment of FIG. 4, the balance may comprise any form of sensor for measuring weight or a force applied under gravity and may comprise a piezo arrangement or an electromechanical arrangement. The arrangement 400 is usable for transporting each of distilled water and ethanol from their respective reservoirs to the refillable container.

While an automated refillable system is disclosed, it is understood that the refilling may be performed manually by a beauty assistant or a consumer.

The inventive embodiments disclosed herein are not limited to the above-stated embodiments, but can be varied freely within the scope of the below-stated patent claims.

The invention claimed is:

1. A method of refilling a container with a fragrance, using a refilling platform comprising a transfer system and defining channels having an inlet and an outlet, the method comprising:

adding a preselected amount of fragrance concentrate to the inlet of the refilling platform wherein the preselected amount of fragrance concentrate is transferred with the transfer system through the outlet of the refilling platform into the container to partially fill the container;

adding an amount of distilled water to the inlet of the refilling platform wherein the distilled water is transferred through the outlet of the refilling platform with the transfer system to the partially filled container containing the fragrance concentrate;

adding an amount of ethanol to the inlet of the refilling platform and transferring the ethanol through the outlet of the refilling platform to the at least partially filled container containing a preselected volume of fragrance concentrate and distilled water so that the container is at least partially filled with fragrance concentrate, distilled water and ethanol, wherein the amount of ethanol is added last, and wherein the amount of ethanol concurrently cleans the amount of fragrance concentrate from the refilling platform and adds to a volume of liquid within the container.

2. The method of claim 1 wherein the container to be at least partially filled with a preselected volume of fragrance concentrate and distilled water and ethanol is opaque.

3. The method of claim 1 wherein the container to be at least partially filled with a preselected volume of fragrance concentrate and distilled water and ethanol is transparent.

4. The method of claim 1, wherein the container comprises a neck and a crimped pump on its neck.

5. The method of claim 1, wherein the container comprises a neck and a screwed pump on its neck.

6. The method of claim 1, further comprising mixing the fragrance concentrate, distilled water and ethanol in the container.

7. The method of claim 1 wherein the refilling platform further comprises a user interface comprising a display wherein a user selects the fragrance concentrate from an array of more than one fragrance.

8. The method of claim 7, wherein selecting the fragrance also selects the amount of distilled water and ethanol added to the container to be refilled.

9. The method of claim 7, further comprising receiving, from the user interface, an input of at least one fragrance concentrate selection;

calculating a target amount for each fragrance concentrate of fragrance concentrate, distilled water and ethanol; and dispensing the calculated target amount of fragrance concentrate, distilled water and ethanol to form a fragrance for refilling the container.

* * * * *